INVENTOR
JOHN F. LANGAN
BY
Cameron, Kerkam & Sutton
ATTORNEYS

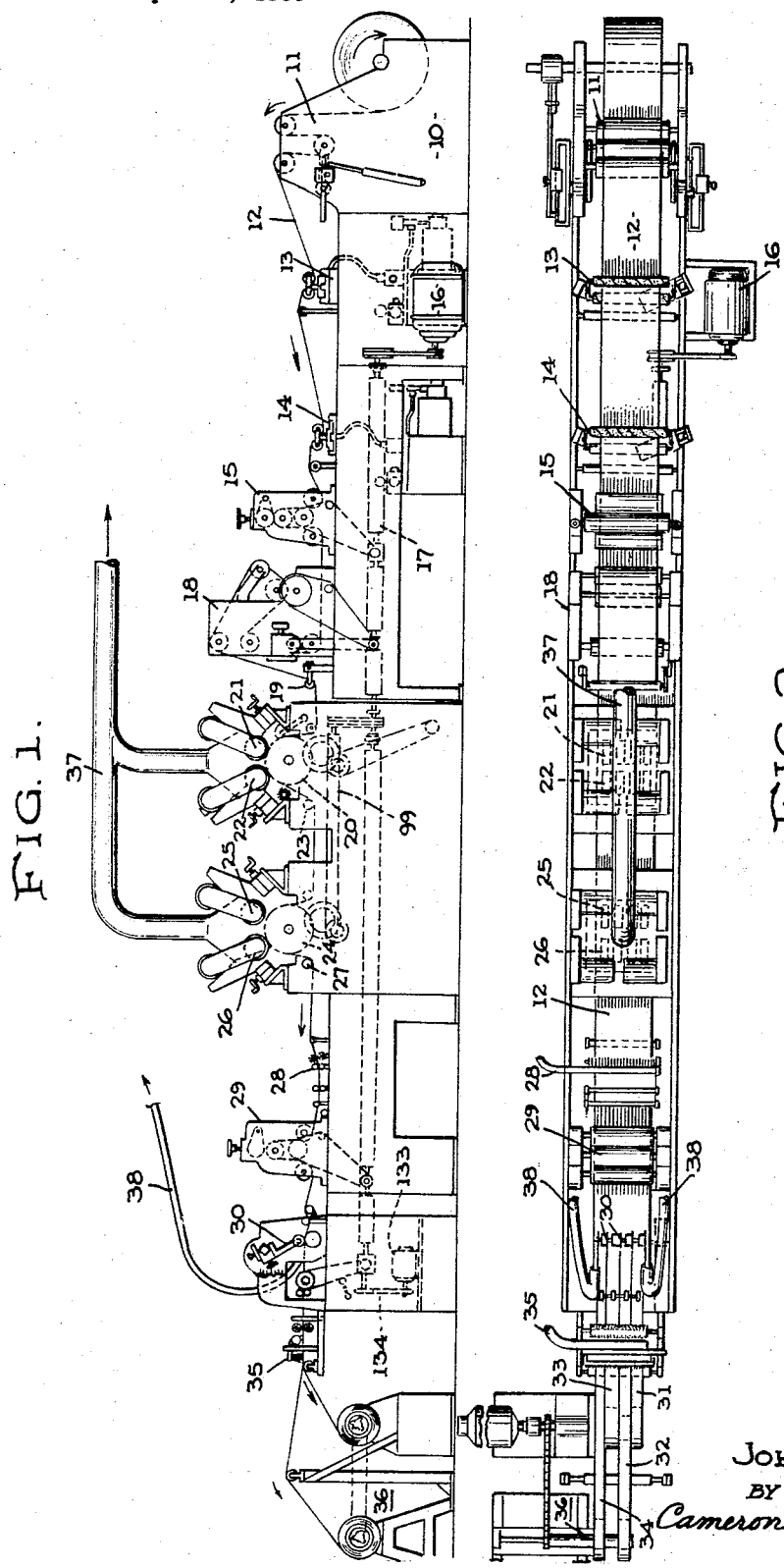

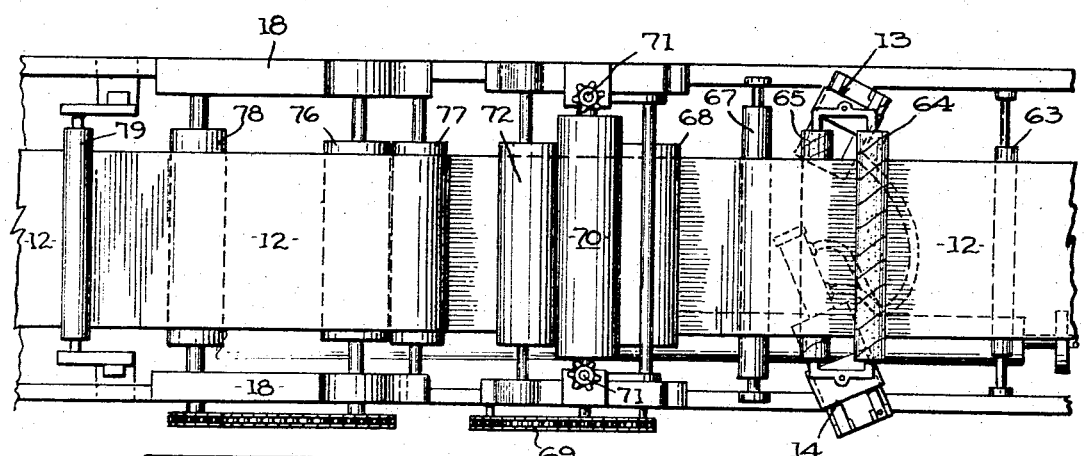
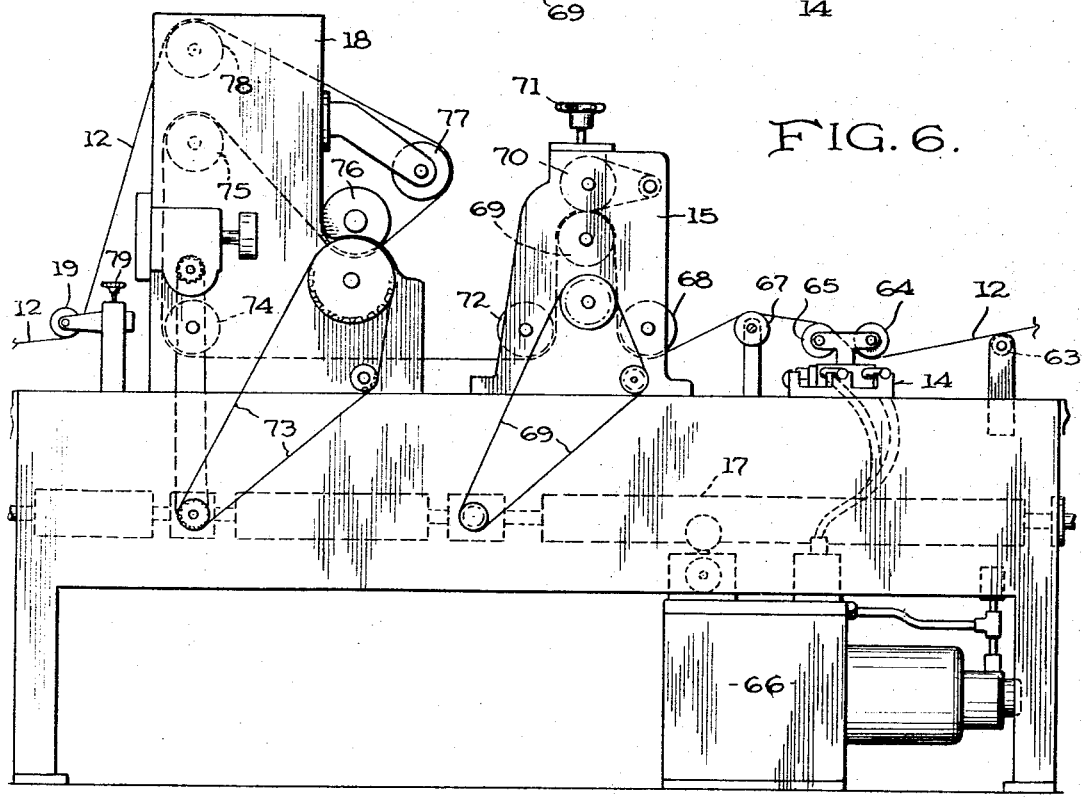

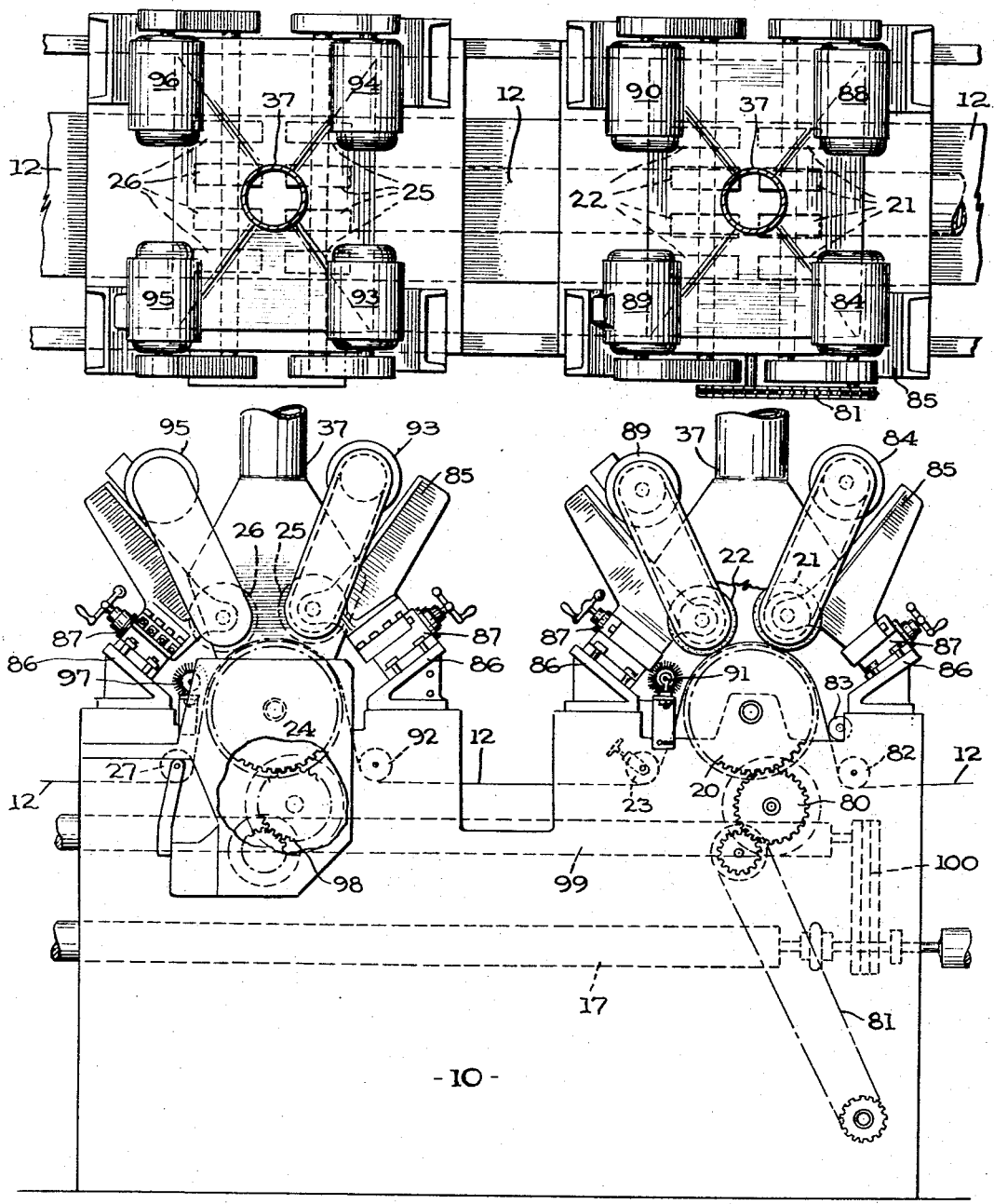

Oct. 3, 1967  J. F. LANGAN  3,344,716
APPARATUS FOR MAKING APERTURE CARDS
Filed Sept. 23, 1965  6 Sheets-Sheet 5

INVENTOR
JOHN F. LANGAN
BY
Cameron, Kerkam & Sutton
ATTORNEYS

Oct. 3, 1967  J. F. LANGAN  3,344,716
APPARATUS FOR MAKING APERTURE CARDS
Filed Sept. 23, 1965  6 Sheets-Sheet 6

INVENTOR
JOHN F. LANGAN
BY
Cameron, Kerkam & Sutton
ATTORNEYS

United States Patent Office 3,344,716
Patented Oct. 3, 1967

3,344,716
APPARATUS FOR MAKING APERTURE CARDS
John F. Langan, Atlanta, Ga., assignor to Langan Aperture Cards, Inc., New York, N.Y., a corporation of Delaware
Filed Sept. 23, 1965, Ser. No. 489,666
13 Claims. (Cl. 93—1)

This invention relates to apparatus for making aperture cards and more particularly to suitable apparatus for carrying out the methods for making aperture cards as described in my allowed copending application Ser. No. 280,486 filed Apr. 26, 1963, now U.S. Patent No. 3,212,-412, granted Oct. 19, 1965.

In that patent, methods for making aperture cards are described which cards are particularly useful in mounting microfilm sections in cards that are capable of being sorted mechanically or sorted by other known systems, particularly to machine sorting of the IBM type.

The methods of my patent include as a first step indenting one side of the card around the outline of the aperture eventually to be cut therein so as to form a trench-like depression in one face of the card and a corresponding ridge-like projection embossed on the opposite surface of the card. The embossing is to a suitable depth to accommodate the thickness of the film to be mounted on the card varying from about 0.003 to about 0.0055 inch. Thereafter the ridge-like embossed projection is removed from the opposite surface of the card so as to restore the surface of this side of the card to a planar condition by any suitable cutting or shaving operation as by high speed grinding or abrasion applied to the cards while moving relatively past the grinding device. A card is then produced which is substantially planar over one side and is planar on the other side as well except that around the outline of the aperture eventually to be cut out there is a trench-like depression the bottom of which is formed by a thin web of card material. When the portion of the card surrounded by this trench is cut out to form the aperture the combined thickness of the film and of the ledge around the aperture is not materially if any more than the thickness of the card.

By way of example, a card initially 0.0067 inch thick may be embossed and ground to a web thickness of about 0.015–0.002 inch in the bottom of the trench around the aperture and the added thickness of the usual silver halide film of say 0.0055 inch makes a total of around 0.007 inch.

The depth to which the blank cards are embossed and the corresponding thickness of the card material at the bottom of the groove will vary depending upon the kind of film to be mounted, the web being for example from about 0.004 inch to about 0.002 inch or less for a film varying in thickness within the above stated range.

It has been proposed heretofore to remove material from one surface of a card by means of grinding or milling so as to thin the card throughout a predetermined area intended to receive a laminar insert such as a film as described in British Patent No. 886,852. Such cards are unsatisfactory because the very thin web of card material remaining over the entire area of the eventual aperture is not strong enough to meet the conditions of use of aperture cards. It has been found to be impractical to employ a grinding or milling tool following the narrow rectangular path characteristic of the present invention relative to each individual card.

In the method of my patent above-identified the deficiencies of the cards disclosed in the prior art are avoided by removal of the material from the card only over the narrow rectangular path and because of the embossing the grinding or milling effect is limited to this area while at the same time the desired removal of the raised or embossed material is accomplished by unidirectional movement of the card past the grinding or milling tool in a single pass. During the grinding or milling it is important to support the embossed area against the pressure of the tool to prevent the card material from being flattened out again with consequent spreading of the effect of the tool beyond the desired limits with failure to accomplish the desired removal. The cards should therefore be left on the embossing die or placed on a similar die-like support while removal of the card material is taking place.

The cards should preferably be printed upon a single continuous web of stock of suitable width to print a plurality of cards in side by side relation thereon and the printed web is then continuously fed to the embossing roll which embosses a plurality of rectangularly shaped portions across the web, one or more for each card, and supports these embossed areas past grinding or milling wheels. The web then continuously leaves the grinding or milling wheels and passes over a second roll which supports the embossed areas while passing additional grinding or milling wheels to complete the removal of material from the embossed areas. The web is then continuously drawn past slitting knives which slit the web continuously into a plurality of continuous sub-webs each said sub-web being one card in width and these sub-webs are individually rolled for subsequent operations in the completion of the aperture card.

High speed production of aperture cards is possible by the methods and apparatus above described providing from 50,000 to 60.000 cards per hour with vastly increased efficiency and accuracy in the milling operations to .0005 inch making it possible to produce aperture cards at much less cost than heretofore possible.

It is therefore an object of the present invention to provide novel apparatus for carrying out the methods of my patent above identified in which aperture cards are continuously produced from a continuous web of stock at high speed and with great accuracy in the location and grinding of the areas surrounding the location of the apertures on each individual card.

Another object of the present invention is to provide such apparatus in which a continuous web of stock of suitable width to provide a plurality of cards across the width thereof is continuously fed, first to a printing roll which continuously prints a plurality of cards across and along the length of the web, the web then being continuously fed to a first embossing roll where rectangular embossed areas for each aperture are formed continuously across the web and along the length thereof with these embossed areas supported on the embossing roll during the embossing roll during the milling of a portion of the thickness of the embossed areas. The web is then continuously fed to a second roll supporting the embossed areas across the web during final milling operations with the web then continuously fed past splitters which split the web into sub-webs, each sub-web being the width of an aperture card. The sub-webs are then continuously wound into rolls suitable for supplying mechanisms performing the final steps of preparing individual aperture cards.

Another object of the present invention is to provide such apparatus in which aperture cards are continuously embossed and milled over the embossed areas at high speeds and with great accuracy in the location of the embossed areas on the cards and in the depths of cut of the embossed areas.

Another and still further object of the present invention is to provide such apparatus employing a novel combination of elements for moving the continuous web accurately and rapidly past the various components of the apparatus to perform the above described embossing and grinding operations thereon with accurate location of the embossed and ground areas on each card portion printed across the continuous web.

Another object of the present invention is to provide such apparatus which is a novel combination of certain known components to provide high speed production of accurately embossed aperture cards having a closely controlled depth of cut of the embossed areas.

Another object of the present invention is to provide such apparatus in which the position of the continuous web can be readily and easily adjusted to bring the areas to be embossed accurately into position on the embossing roll and thereafter to bring the partially ground embossed areas accurately into position on the second or support roll for the final grinding or abrading of the embossed areas.

Other and further objects of the present invention will appear from the following description of an illustrative and preferred embodiment thereof.

The apparatus of the present invention is capable of various mechanical embodiments one of which is shown in the accompanying drawings and is described hereinafter to illustrate a preferred embodiment of the apparatus. This illustrative disclosure should in no way be construed as defining or limiting the scope of the present invention.

In the accompanying drawings, in which like reference characters indicate like parts, FIG. 1 is a side elevation of a preferred embodiment of apparatus in accordance with the present invention;

FIG. 2 is a view from above of the embodiment of FIG. 1;

FIG. 5 is a view from above of another portion of the apparatus of FIG. 1 showing the second mechanism for aligning the continuous web of card material; draw rolls for drawing the continuous web of card material from the supply thereof; and the mechanism for printing the cards on the web of material together with mechanism for adjusting the position of the web after it leaves the printing roll;

FIG. 6 is a side elevational view of the mechanism of FIG. 5;

Figure 9:
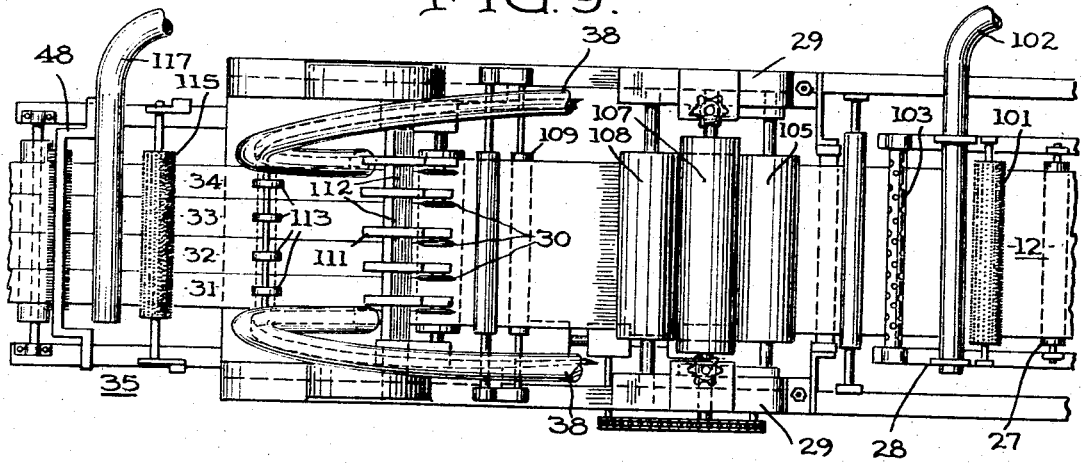
Figure 10:
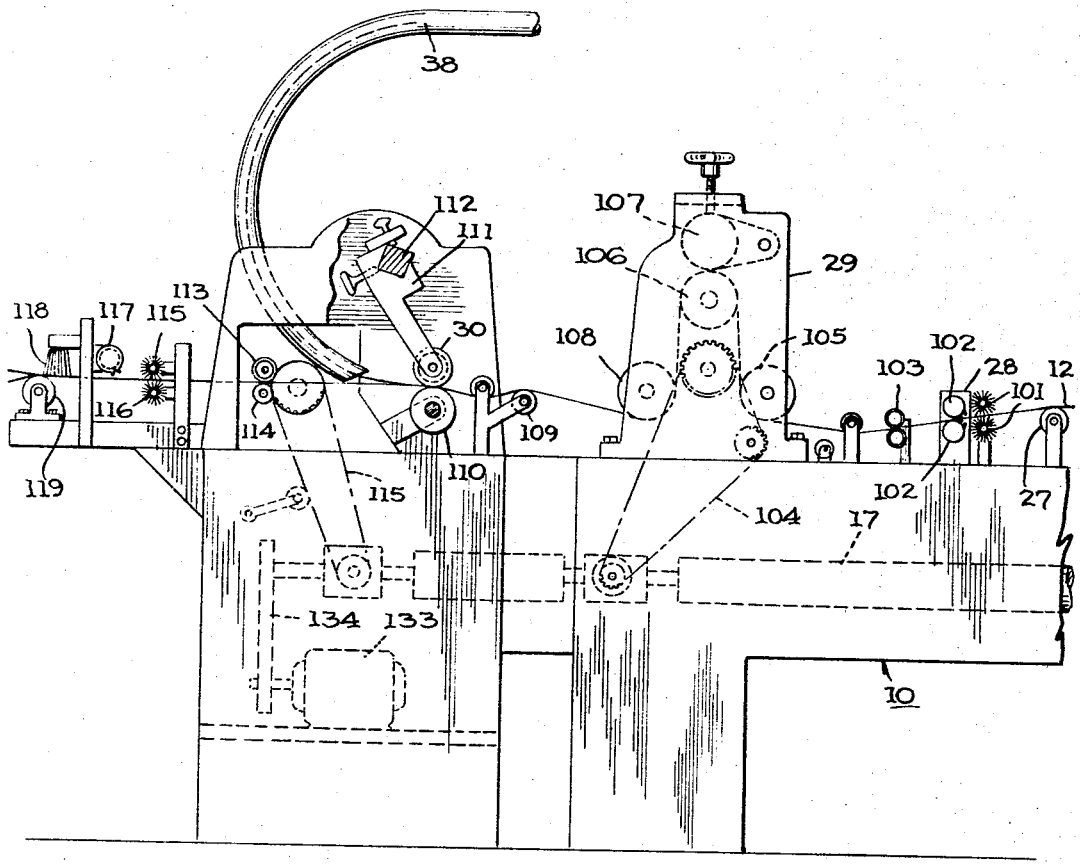
Figure 11:
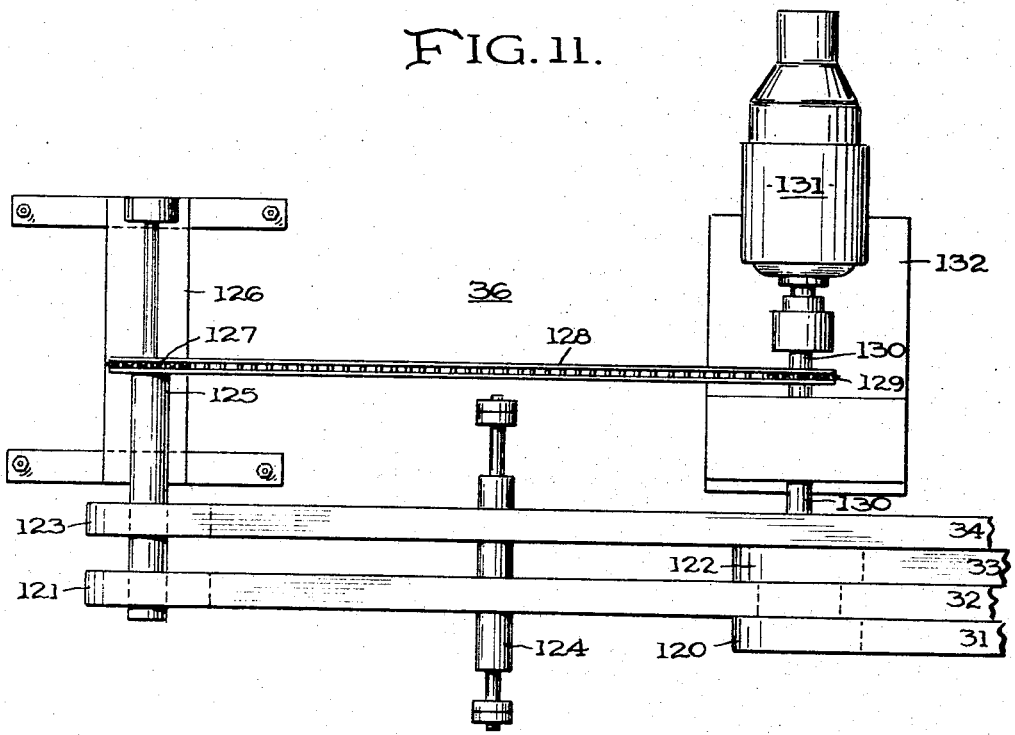
Figure 12:
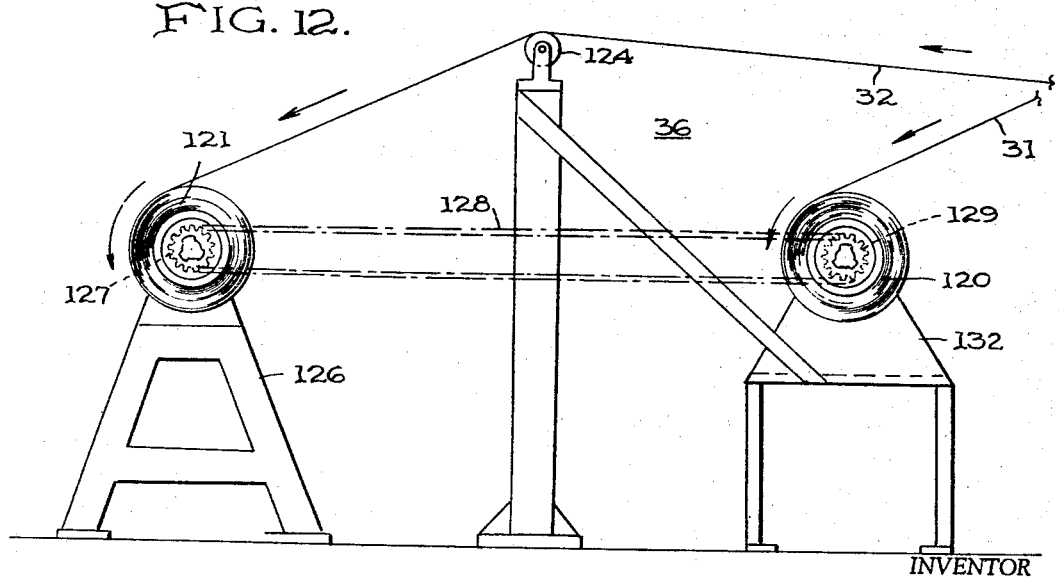

FIG. 7 is a view from above of a portion of the apparatus of FIG. 1 showing the embossing roll and grinding wheels associated therewith; the adjustable mechanism for controlling the position of the continuous web leaving the embossing roll; the support roll and grinding wheels associated therewith for completing the abrading of the embossed areas on the continuous web; and exhaust heads for removing the paper dust from the grinding areas;

FIG. 8 is a side elevational view of the mechanism of FIG. 7;

FIG. 9 is a view from above of a portion of the apparatus of FIG. 1 showing the final draw roll assembly; the slitters for cutting the web of card material into sub-webs each of which is one card in width; and various brushes and vacuum devices for removing dust and waste materials from the webs;

FIG. 10 is a side elevational view of the mechanism of FIG. 9;

FIG. 11 is a view from above of a portion of the apparatus of FIG. 1 showing the mechanism for winding the sub-webs into rolls; and FIG. 12 is a side elevational view of the mechanism of FIG. 11.

Referring now to FIGS. 1 and 2, the apparatus is there seen to comprise any suitable main frame 10 on which is mounted a suitable source of supply of material for the aperture cards generally indicated at 11, the web of material being shown at 12 which web passes a suitable pneumatic aligning mechanism at 13 passing then to a second pneumatic aligning mechanism 14 before the web 12 enters drawing rolls generally indicated at 15. The mechanism is driven by a suitable main motor 16 coupled to a main drive shaft 17 which extends the length of frame 10 and from which power take-offs are used to drive the various elements of the apparatus such as the draw rolls 15. From draw rolls 15 the web 12 passes to the printing mechanism generally indicated at 18 where the web is printed as may be desired to outline the aperture cards thereon and to reproduce any suitable indicia thereon, in the embodiment shown there being four cards printed across the width of the web 12.

From the printing mechanism 18 web 12 passes beneath adjustable roller 19 which adjusts the relative length of the web 12 with respect to embossing roll 20 so that the appropriate portions of each printed card exactly register with the raised portions on roll 20 whereby each card is embossed about the area of the aperture. Web 12 passes over embossing roll 20 and the raised embossed areas of each card are engaged by grinding wheels 21 and 22 to abrade a portion of the embossed raised part of each card. Thereafter web 12 passes beneath idler roll 23 which may be adjustable to control the position of web 12 as it passes to support drum 24 where the embossed areas of each card are supported while passing beneath grinding wheels 25 and 26 where the final cuts are made to bring the remaining portions of the embossed areas to desired thickness, it being preferred that each abrading or cutting operation as performed at 21, 22, 25 and 26 remove one-fourth of the total thickness to be removed. Web 12 then leaves grinding wheels 26 and passes beneath idler roll 27 and past suitable cleaning devices generally indicated at 28 and through final draw rolls 29 to slitters generally indicated at 30 where web 12 is divided into four sub-webs, each sub-web being one aperture card in width, these sub-webs being generally indicated at 31, 32, 33 and 34. Additional suitable cleaning mechanism for the sub-webs is generally indicated at 35 with mechanism for rolling the sub-webs into rolls being generally indicated at 36. Vacuum exhaust apparatus generally indicated at 37 is provided for removing paper dust from the area of the grinding wheels and additional vacuum exhaust apparatus generally indicated at 38 is employed for removing waste web material from adjacent the slitting mechanism 30.

Figure 3:
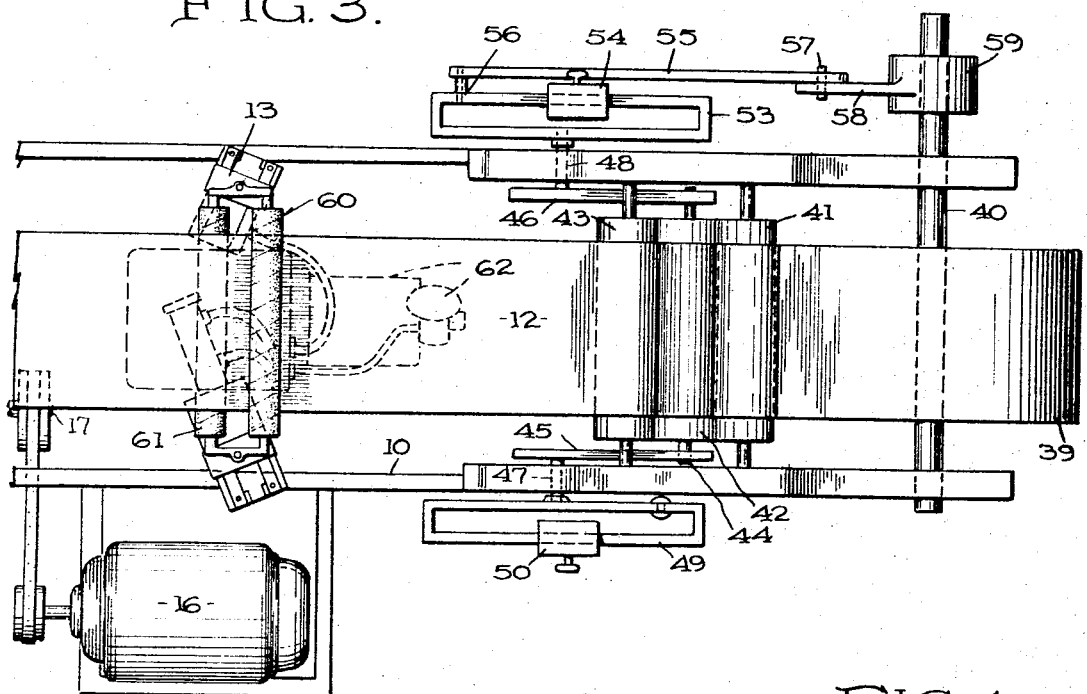
FIG. 3 is a view from above of a portion of the apparatus of FIG. 1 showing the supporting mechanism for the supply of the web of card material; a first mechanism for aligning the web as it moves from the supply; and the main drive motor for the apparatus.
Figure 4:
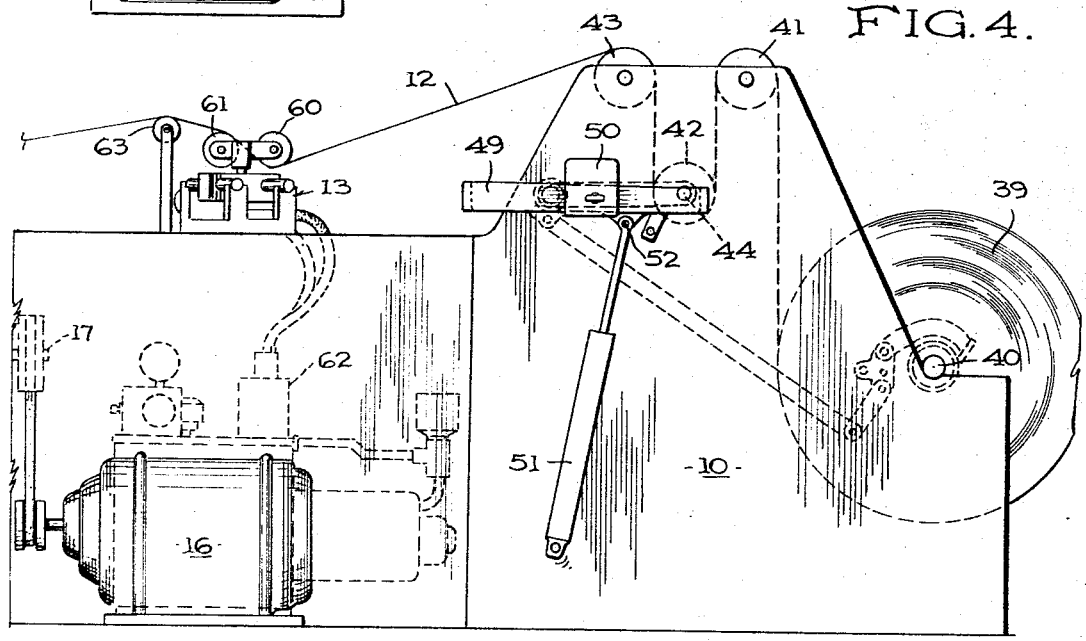
FIG. 4 is a side elevational view of the mechanism of FIG. 3.

Referring now to FIGS. 3 and 4, the supply for web 12 is a roll thereof indicated at 39 which roll is mounted for rotation on axle 40 carried by frame 10. The web 12 leads from roll 39 over idler roll 41 mounted for rotation in frame 10 and then passes under adjustable roll 42 and from roll 42 over idler 43, roll 43 being mounted in frame 10. Roll 42 is supported on axle 44 which is mounted between arms 45 and 46 and arms 45 and 46 are mounted on shafts 47 and 48, respectively, which pass through frame 10 and are rotatably mounted therein. An open rectangular frame 49 is mounted on shaft 47 and carries adjustable weight 50. Movement of frame 49 is controlled by a dash pot 51 connected to frame 10 and to frame 49 at 52. An open rectangular frame 53 is mounted on shaft 48 and carries adjustable weight 54. A connecting rod 55 is pivotally connected to frame 53 at 56 and is pivotally connected at 57 to brake arm 58 of brake 59 which engages axle 40.

With this mechanism when the speed of movement of web 12 increases roller 42 will rise and, acting through arm 46, shaft 48, frame 53, connecting rod 55 and brake arm 58, will reduce the pressure exerted by brake 59 on shaft 40 allowing roll 39 to turn more freely to make up for the increased speed of web 12. When web 12 slows down roller 42 drops and utilizing the same linkage mechanism as above described applies the brake 59 to shaft 40 slowing the rotation of roll 39 to provide an even feed of web 12 therefrom. Suitable adjustment of the positions of weights 50 and 54 adjusts the force exerted by brake 59 for the normal movement of web 12 to the draw rolls later to be described.

Web 12 passing from roll 43 passes under rolls 60 and over rolls 61 of a conventional servo centerer generally indicated at 13 this centerer being provided with compressed air for its actuation from source 62. The servo centerer indicated at 13 senses an edge of web 12, in known manner, and rollers 60 and 61 are moved laterally of web 12 as required to maintain the alignment of web 12 in the apparatus.

From centerer 13 web 12 passes over an idler roll 63 and then, as seen in FIGS. 5 and 6, passes to a second pneumatically actuated servo centerer generally indicated at 14 passing under roll 64 thereof and over roll 65 thereof, centerer 14, as in the case of centerer 13, sensing an edge of web 12 and maintaining the alignment of web 12 by shifting rolls 64 and 65 laterally as required. Centerer 14 is supplied with compressed air from any suitable source 66.

From centerer 14 web 12 passes over idler roll 67 and beneath roll 68 of the draw roll assembly generally indicated at 15, the rolls in this assembly being powered by power take-off 69 from main drive shaft 17. Web 12 passes over drive roll 69 and beneath pressure roll 70. The position of roll 70 is adjusted with respect to roll 69 by manual means 71 to provide the desired nip of web 12 between rolls 69 and 70 to draw the web 12 through the preceding portion of the apparatus.

Web 12 leaves draw rolls 15 beneath roll 72 and passes to any suitable printing roll mechanism generally indicated at 18. Printing roll mechanism 18 is driven by a power take-off 73 from main drive shaft 17 with web 12 passing beneath roller 74 and over roller 75 to printing roll 76 and from printing roll 76 over rolls 77 and 78 to adjustable roll 19. Roll 19 is adjustable vertically by manually actuatable screw 79 with respect to frame 10 to vary the effective length of the web 12 as it comes to the embossing roll 20 now to be described. The adjustment of position of roll 19 is required to bring the areas on the aperture cards printed on web 12 to be embossed accurately into position with respect to the embossing lands on embossing roll 20.

Referring now to FIGS. 7 and 8, embossing roll 20 is provided with raised embossing lands thereon to emboss a rectangular area about the portion of each card to be apertured as described in my patent discussed above. In the present embodiment there are four such rectangular embossing lands across the roll and these lands are spaced circumferentially about the roll so as to continuously emboss the appropriate areas of the cards printed on web 12 as web 12 passes continuously over roll 20. Embossing roll 20 is driven through a suitable gear train 80 which train in turn is driven by a power take-off 81 connected to main drive shaft 17.

Web 12 passes beneath idler roll 82 mounted in frame 10 and thence beneath pressure roll 83 which roll 83 forces the web 12 down upon the raised embossing lands of roll 20 to emboss the web in the aforesaid rectangular portions surrounding the area to be apertured on each card and raises these rectangular areas above the upper surface of web 12. Web 12 then passes around the upper portion of the circumference of embossing roll 20 with the embossed portions mounted on the embossing lands beneath first grinding wheels 21 two of which wheels are suitably driven by electric motor 84. Two of grinding wheels 21 and motor 84 are mounted on a suitable frame or carriage 85 which in turn is slidably mounted on bracket 86 secured to frame 10. Micrometer adjustment mechanism 87 moves carriage 85 relative to bracket 86 and thus adjusts the position of two of grinding wheels 21 with respect to web 12 thus determining and adjusting the amount of cut performed by these two grinding wheels 21 on the embossed areas of web 12.

As noted above, the present apparatus is designed for a width of web 12 equivalent to the width of four aperture cards and one grinding wheel 21 is provided for each card surface to be abraded. As shown in FIGS. 7 and 8, two grinding wheels 21 are driven by motor 84 for the first two card areas on web 12 while third and fourth grinding wheels 21 are driven by a separate motor 88 in every way identical to motor 84 and similarly mounted for adjustment of position of its grinding wheels 21 with the surface of web 12.

The positions of grinding wheels 21 are so adjusted with respect to web 12 that they will remove approximately one-fourth of the total thickness to be abraded from the embossed areas.

Web 12 then passes beneath grinding wheels 22 which are powered by motors 89 and 90 which are mounted similarly to motor 84 for accurate adjustment of the positions of wheels 22 with respect to web 12 so that wheels 22 will remove approximately one-fourth of the amount of material to be taken from the embossed areas. As in the case of grinding wheels 21, a grinding wheel 22 is provided for each embossed card area on web 12.

From grinding wheel 22 web 12 passes beneath an idler brush 91 which looses paper dust on web 12 for removal by vacuum means generally indicated at 37. Web 12 then passes under idler roller 23 which is adjustable in position so as to vary the effective length of web 12 as presented to support roll 24 so that the embossed areas on web 12 come into exact register with corresponding supporting lands on roll 24.

Web 12 then passes beneath idler roll 92 and over the upper portion of the circumference of the support roll 24 with the raised supporting lands thereof in exact engagement with the embossed areas of web 12. Web 12 then passes beneath grinding wheels 25 which are driven by motors 93 and 94. Motors 93 and 94 and grinding wheels 25 are mounted in identical manner to motor 85 and its grinding wheels 21 so that the position of grinding wheels 25 with respect to web 12 can be accurately adjusted. Grinding wheels 25 remove approximately one-fourth of the amount of material to be taken from the embossed areas. It will be noted that there are four grinding wheels 25, two such wheels being driven by each motor 93 and 94, with one grinding wheel 25 being provided for each embossed card area on web 12. Web 12 then passes beneath grinding wheels 26 where the final increment is abraded of approximately one-fourth of material to be removed from the embossed areas. Grinding wheels 26 are driven by suitable motors 95 and 96 each motor 95 and 96 and its associated grinding wheels 26 being mounted identically to motor 84 and its grinding wheels 21 for accurate adjustment of position of grinding wheels 26 with respect to web 12 for removal of the exact amount of material from the embossed areas.

Support roll 24 may be driven by any suitable gear train 98 which in turn is driven by drive shaft 99 rotated from main shaft 17 through power take-off 100.

Web 12 then passes beneath idler brush 97, which loosens any paper dust adhering to web 12 for removal through vacuum hood 37, and then passes beneath idler roller 27 to the final draw rolls now to be described.

The speeds of rotation of embossing roll 20 and of support roll 24 must be accurately controlled and should be identical so that there is no distortion of the embossed areas on support roll 24. When it is found that the embossed areas on web 12 are not mating exactly with the supporting lands on roll 24, the position of idler roll 23 can be adjusted manually to bring the embossed areas and supporting lands into exact coincidence.

As will be seen in FIGS. 9 and 10, web 12 passes from idler roll 27 through opposed free turning brushes 101 and between vacuum tubes 102 at cleaning station 28 to remove particles of paper adhering to the web. Web 12 then passes through destatic tubes 103 to remove any static electricity on the web before passing to final draw roll assembly 29. Draw roll assembly 29 is powered by drive shaft 17 through power take-off mechanism 104 and includes an idler roll 105 and a drive roll 106. Manually adjustable pressure roll 107 cooperates with roll 106 to nip web 12 on roll 106. Web 12 then passes beneath idler roll 108 and past support rolls 109 to slitting knives 30, each knife 30 having an anvil roller 110 cooperating with it. Five knives 30 are seen in FIG. 9 with each knife being mounted on an arm 111 which arm is suitable and adjustably mounted on cross shaft 112 carried by frame 10 so that the spacing of knives 30 can be adjusted to provide sub-webs 31–34 of determined width and to trim any left-over edges from web 12. Trimmed edges from knives 30 are moved from the apparatus through vacuum conduits 38.

Each sub-web 31–34 is then caught between drive wheels 113 and 114 which drive wheels are powered by suitable power take-off 115 from drive shaft 17. Webs 31–34 then pass through idler cleaning brushes 115 and 116 and beneath a vacuum tube 117 and under a final brush 118 at cleaning station 35 to remove all traces of dust from the sub-webs. The sub-webs then pass over support roller 119 before passing to the winding mechanism now to be described.

Referring now to FIGS. 11 and 12, sub-webs 31–34 leaving support roller 119 are wound upon individual drums, web 31 being wound on drum 120; sub-web 32 being wound on drum 121; sub-web 33 being wound on drum 122; and sub-web 34 being wound on drum 123. Sub-webs 32 and 34 pass over support roller 124 before reaching their drums 121 and 123. Drums 121 and 123 are mounted on shaft 125 which is mounted for rotation in a suitable A-frame 126 and is driven by sprocket 127 and chain 128. Chain 128 passes around sprocket 129 on shaft 130 of electric drive motor 131. Motor 131 and its shaft 130 are mounted on a suitable support 132 and shaft 130 carries drums 120 and 122 for sub-webs 31 and 33. The speed of motor 131 is suitably controlled by conventional means to provide a uniform speed of movement of sub-webs 31–34 regardless of the diameter of the rolls of these sub-webs. The speed of rotation of motor 131 is correlated with the speed of rotation of main drive shaft 17 through auxiliary generator 133 which is driven from shaft 99 through power take-off 134. The output of generator 133 is supplied to motor 131 through known circuitry to provide the necessary correlation between the speed of sub-webs 31–34 and the speed of web 12 through the apparatus.

It should now be apparent that the present invention in every way satisfies the several objectives discussed above.

Changes in or modifications to the above described illustrative embodiment of this apparatus may now be suggested to those skilled in the art without departing from the present inventive concept. Reference should therefore be had to the appended claims to determine the scope of this invention.

What is claimed is:

1. Apparatus for making aperture cards comprising a base, a supply of continuous web of card material, means mounted on said base for continuously drawing said web from said supply, means for maintaining the alignment of said web between said supply and said drawing means, means mounted on said base for continuously printing card indicia on said web received from said drawing means, a rotary embossing roll mounted on said base for continuously embossing areas about the aperture location on each printed card indicia on said web received from said printing means, adjustable means between said printing means and said embossing roll for positioning said printed card indicia on said web with respect to said embossing roll, grinding means adjacent said embossing roll for removing a part of the thickness of the embossed areas on said web, a rotary support roll mounted on said base for continuously receiving said web from said embossing roll and for supporting the embossed areas on said web, means between said embossing roll and said support roll for adjusting the position of said web with respect to said support roll, grinding means adjacent said support roll for removing a further part of the thickness of the embossed areas on said web, means mounted on said base for continuously drawing said web from said support roll, slitting means on said base for continuously slitting said web received from said last named drawing means into card width continuous sub-webs and means for winding said sub-webs individually into rolls.

2. Apparatus as described in claim 1 including unitary power supply means for driving said means for drawing said web, for driving said printing means, for rotating said embossing roll and for rotating said support roll.

3. Apparatus as described in claim 1 including means adjacent said grinding means and adjacent said slitting means for removing paper dust and trim from said web.

4. Apparatus as described in claim 1, said supply of web of card material comprising a roll of card material mounted for rotation on said base, brake means for controlling the rotation of said roll of card material and a roller bearing on said web and connected to said brake means for actuating said brake means.

5. Apparatus as described in claim 1, each of said grinding means comprising a plurality of grinding wheels spaced across said web, at least one of said grinding wheels being provided for each of the embossed areas on said web, means for rotating said grinding wheels and means for adjusting the positions of said grinding wheels with respect to the embossed areas on said web whereby each of said grinding wheels removes a part of the thickness of the embossed areas on said web.

6. Apparatus as described in claim 2 including means driven by said unitary power supply means for drawing each of said sub-webs from said slitting means.

7. Apparatus as described in claim 1, said means for winding sad sub-webs individually into rolls including separate power supply means for rotating said last named rolls at varying speeds providing a constant speed of movement for said sub-webs.

8. Apparatus as described in claim 1 including rotary idler brushes engaging said web adjacent said grinding means for loosening paper dust on said web.

9. Apparatus as described in claim 1 including rotary idler brushes adjacent said last named drawing means and adjacent said slitting means for loosening paper dust on said web and vacuum means adjacent said brushes for removal of the paper dust.

10. Apparatus as described in claim 1, said slitting means dividing said web into four sub-webs.

11. Apparatus for making aperture cards comprising a base, means mounted on said base for drawing a continuous web of card material from a supply through said apparatus, means mounted on said base for marking said moving web with indicia outlining successive card lengths thereof, rotary means on said base for embossing and supporting areas about the aperture locations in said successive card lengths, adjustable means engaging said web ahead of said rotary means for adjusting said web longitudinally to position the points of web engagement by said embossing and supporting means with respect to said indicia, a plurality of grinding means spaced along that portion of the travel of said web in which said areas are supported by said rotary means, said grinding means engaging the supported areas and successively removing portions of their thickness, and means for withdrawing said web from said apparatus.

12. Apparatus as described in claim 11 wherein said rotary means comprises a pair of rolls both having embossing and supporting lands thereon, said web passing around said rolls in succession and some of said grinding means being disposed at each roll, and a second adjustable means engaging said web between said rolls for adjusting said web longitudinally to position the points of web engagement by said second roll with respect to said indicia.

13. Apparatus as described in claim 11, said web having a width equal to a plurality of cards and said embossing and supporting means including elements individual to each section of width of the web, together with means for slitting the web longitudinally to divide it into a plurality of sub-webs each having the width of a single card.

References Cited
UNITED STATES PATENTS

| | | | |
|---|---|---|---|
| 2,218,674 | 10/1940 | Eaton | 51—5 |
| 3,293,996 | 12/1966 | Luning | 93—1 |

BERNARD STICKNEY, *Primary Examiner.*